Oct. 13, 1953  E. R. G. ECKERT ET AL  2,655,074
INTERFERENCE-SCHLIERN APPARATUS WITH
SIMPLIFIED COMPENSATION PRINCIPLE
Filed Feb. 15, 1951  2 Sheets-Sheet 2
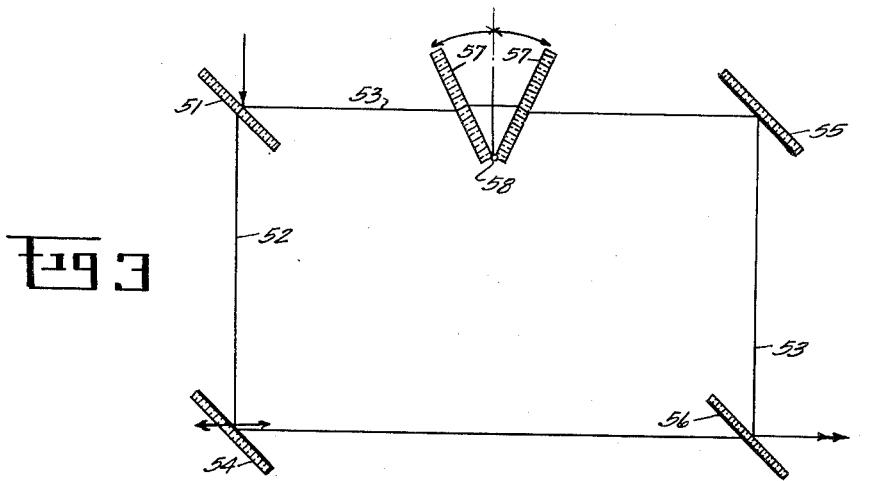
Fig 3
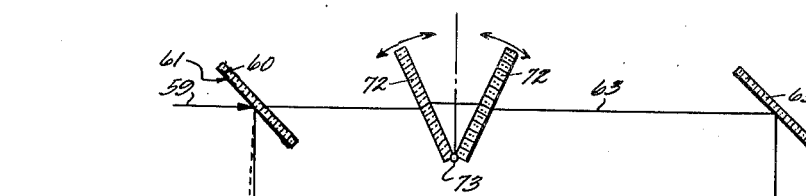
Fig 4
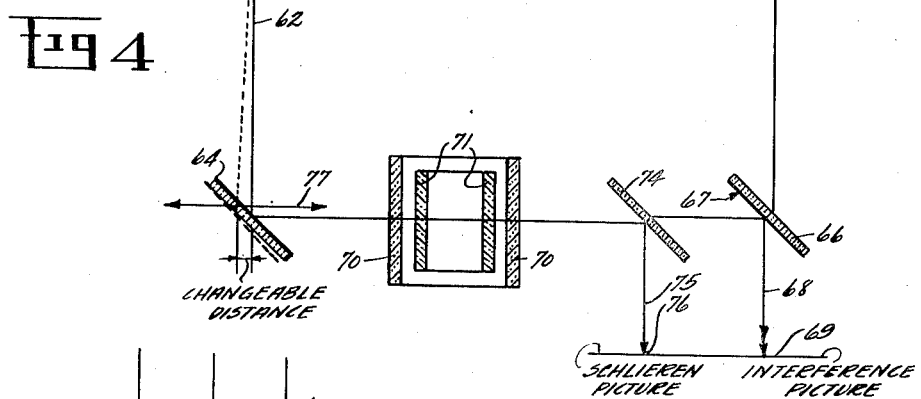
CHANGEABLE DISTANCE
SCHLIEREN PICTURE   INTERFERENCE PICTURE
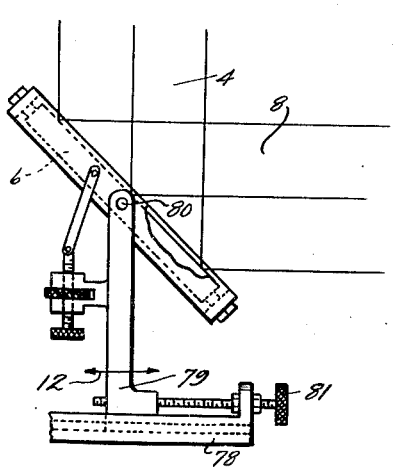
Fig 5
INVENTORS.
THEODOR W. ZOBEL
ERNST R. G. ECKERT
BY
ATTORNEYS Patented Oct. 13, 1953

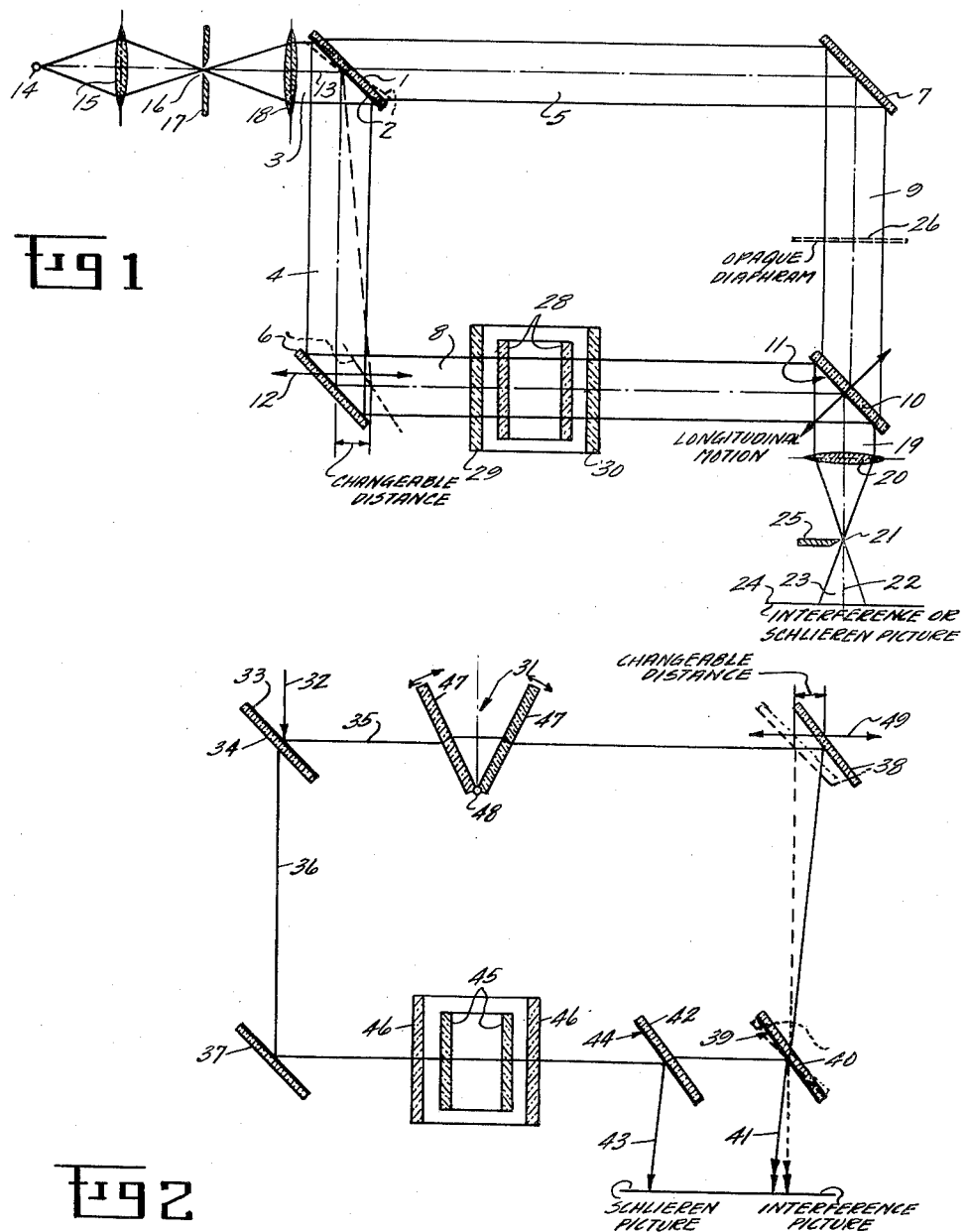

2,655,074

UNITED STATES PATENT OFFICE 2,655,074

INTERFERENCE — SCHLIEREN APPARATUS WITH SIMPLIFIED COMPENSATION PRINCIPLE

Ernst R. G. Eckert, Lakewood, and Theodor W. Zobel, Dayton, Ohio, assignors to the United States of America as represented by the Secretary of the Air Force Application February 15, 1951, Serial No. 211,172

1 Claim. (Cl. 88—14)

(Granted under Title 35, U. S. Code (1952), sec. 266)

The invention described herein may be manufactured and used by or for the United States Government for governmental purposes without payment to us of any royalty thereon.

This invention relates to interference—schlieren apparatus and more particularly to improvements in compensating means for equalizing the optical paths between the test and comparison beams of interference—schlieren apparatus.

In interferometer apparatus, all glass plates, except the basic reflector system, for instance the plates used as the test section windows change the optical way within this light path and must be compensated for in order to obtain the best basic adjustment of the interferometer apparatus and of the interference phenomena. A criterion for this kind of adjustment is the zero interference phenomena which can be obtained by using white light, if both interfering light paths have exactly the same optical length.

When all of the beam splitter plates and full mirrors of a four-plate Mach-Zehnder interferometer have a special critical relation to each other, interference phenomena can be obtained on a screen outside of the interference apparatus. If all of the reflecting surfaces are exactly parallel to each other, theoretically no interference fringes appear on the screen because the width of the fringe is indefinite. When the interference rays, leaving the apparatus have an angle $\alpha$, fringes of finite width appear on the screen. The larger the angle $\alpha$, the closer together the interference fringes according to the equation $$b = \frac{\lambda/n}{\alpha}$$

where $b$ is the width of the fringe, $\lambda$ the wave length of the light used, $n$ the index of refraction, and $\alpha$ the angle between the interfering light rays. Using white light only, a small group of interference fringes with one darker fringe in the center appears if both light paths (of the test and comparison beams) are exactly, optically, the same. The control of the geometrical length of both of these light paths can be made by a longitudinal adjustment of any of the four basic plates. Additional plates such as wind tunnel windows, according to the subject invention can be roughly compensated for by the partially transparent beam splitting plates. The fine adjustment of the two light paths, in order to obtain zero interference phenomenon, can be made by longitudinal adjustment of the second beam splitter plate.

According to the invention the arrangement shown can also be used as a schlieren apparatus and produce schlieren or interference fringes on the screen with a minimum adjustment of the apparatus. A further improvement is the inclinable compensator used in the apparatus. A fine adjustment can be made for variations in the light path due to its passage through windows in the test section, or wind tunnel, without disturbing or touching the finely adjusted optical components within the four plate system or changing the axis of the light path in the basic interferometer apparatus, by a simple adjustment of the improved compensator device.

One object of the invention is also characterized by the fact that all glass plates installed in the apparatus within the measuring light beam, in addition to the basic plate system, can be compensated for by an inclinable plate compensator in combination with a distance control or adjustment of one of the basic four plates in order to obtain any grade of rough compensation, with no influence on the optical angle adjustment during fine adjustment, by employing the inclinable compensation alone for the fine adjustment.

Another object is characterized by the fact that one of the two light paths passes through both of the beam splitting plates and that their thickness may be made to compensate for the passage of the other partial light beam through the windows of the test section, and fine adjustments can be accomplished either by adjustment of an inclinable compensator disposed in one of the light paths, or by longitudinal, and very slight angular, adjustment of one of the four plates of the basic interferometer apparatus.

A further object is the provision of an interferometer apparatus in which the measuring light beam does not pass through any glass of the four plate system but only additional glasses, for instance test section plates and the schlieren splitting plate, whereby the rough compensation or the entire length compensation, can be made by moving the full mirror in the measuring beam parallel to the light passing the object of observation, in order to avoid any correction of the terminal optical system behind the apparatus, such as the camera or interference viewing screen, or its optical elements.

Other objects and advantages will become apparent from the following description, taken in connection with the accompanying drawings, in which like reference characters refer to like parts in the several figures.

*Drawings*

Fig. 1 is a schematic plan view of an interferometer apparatus incorporating our invention.

Fig. 2 is a further modification, incorporating the inclinable compensator and utilizing longitudinal adjustment of one of the full mirrors for providing equalizing adjustment between the two partial light beam optical distances.

Fig. 3 is a simplified arrangement incorporating the inclinable compensator device, and utilizing the inclinable compensator to compensate for the test section windows and provide for the fine or zero adjustment of the apparatus.

Fig. 4 is a schematic plan view somewhat similar to Fig. 2 in which the two beam splitter plates and the inclinable compensator plates in the comparison beam are utilized to equalize the optical length of the light path of the measuring beam through the test section windows and the schlieren beam splitter plate and includes a secondary or fine initial adjustment between the two optical light paths of the measuring and comparison beams by longitudinal and angular adjustment of the full mirror in the measuring light beam, and Fig. 5 is a detail view of one form of adjustment which may be used for the longitudinal and angular adjustment of the adjustable mirror or mirrors of the basic interferometer system.

Referring to Fig. 1 the basic interferometer system includes means for producing a beam of parallel light rays from a light source, a first inclined beam splitter plate 1 having a partially transparent reflecting surface 2 which splits the collimated light beam 3 to provide a collimated measuring light beam 4, reflected by the plate 1 and a collimated comparison light beam 5 passing through the plate 1. Front surfaced full mirrors 6 and 7 are inclined across the beams 4 and 5, parallel to the splitter plate 1, reflecting the partial beams 4 and 5, as indicated at 8 and 9, across each other, the second beam splitter plate 10, being inclined across the intersecting beams is provided with a partially transparent reflecting surface 11 facing the full mirror 6. The full mirror 6 is adjustable in the longitudinal direction in this form of the invention as indicated by the arrow 12, and angularly adjustable around intersection of the axis 13 of the initial light with the reflecting surface 2 of the splitter plate 1, beam 3. The beam 5, 9 is the comparison beam while the measuring beam is indicated at 4, 8, light being initiated from the light source 14, passes through a condensing lens 15 which converges the light through the point 16 where an aperture, or a light slit 17, is located. The lens 18 having its focal point at the point 16 collimates the light to form the initial collimated light beam 3.

The measuring and comparison beams 4, 8 and 5, 9 are combined by the beam splitter plate 10 to form the interference beam 19, a positive lens 20 converging the beam 19 through its focal point 21, and the expanding interference beam 22 forms an interference image 23 on the screen 24.

If a schlieren image is desired the aperture 17 will preferably be a slit and a schlieren knife edge 25 will be disposed parallel (optically) to the edge of the slit aperture 17 and adjusted to just enter or touch the concentrated interference beam at the point 21 in the interference beam 19. The same viewing or camera screen 24 is used for both interference images and schlieren. When pure interference fringes are desired the knife edge 25 is withdrawn. When schlieren is desired the knife edge is brought into engagement with the side of the light beam at 21, and in order to eliminate the fringes from the image 23 on the screen 24 an opaque plate 26 is inserted somewhere in the comparison beam 9, as shown. The test medium is located in the test section having plate windows 28 through which the measuring beam passes.

By passing the comparison beam 5, 9 through both of the beam splitter plates 1 and 10, as shown in Fig. 1, it is possible to use these two beam splitter plates as a rough compensator means for equalizing the change in the optical length of the measuring beam 4, 8 through the windows 28 of the test section, if the glass thickness of the splitter plates, through which the comparison beam 5, 9 passes is substantially the same as the thickness of the glass plates of the test section. If additional windows 29 and 30 are used in the test section, these must be compensated for in the comparison beam by glass of similar optical thickness. This may be also accomplished by the use of our inclinable compensator device in the comparison beam as shown in Fig. 2 at 31. The full mirror 6 being adjustable as before indicated allows the two distances in the test and comparison beams from the center of the test section to the splitter plate 10, and from the full mirror 7 to the splitter plate 10 to remain unchanged, the fine adjustment being accomplished by the micro movement of the full mirror 6, as shown in dotted lines.

Referring to the construction illustrated in Fig. 2 the collimated light beam is indicated at 32 from a light source, similar to that shown in Fig. 1. The initial beam 32 strikes the partially silvered side 33 of the mirror or beam splitting plate 34 splitting the light beam 32 to form the comparison light beam 35 and the measuring beam 36. This arrangement also shows a parallelogram arrangement in which the respective beams 35 and 36 are reflected by the full mirrors 37 and 38 to and through the partially transparent reflecting surface 39 of the beam splitting plate 40, forming the interference beam 41.

A second beam splitter plate 42 is provided for producing the schlieren beam 43. The plate 42 is a partially transparent reflecting surface 44. The reflecting surfaces of the beam splitter plates 42 and 40 face the full mirror 37 while the reflecting surface 33 faces the full mirror 38. The test or measuring beam 36 passes through the splitter plates 34 and 42 as well as through the windows 45 and the additional window plates 46. These glass plates must be compensated for in the comparison beam to equalize the optical light paths in the respective beams 35, 36. Since one of the beam splitter plates 34 and 40 is in each of the beams they compensate each other. An inclinable compensator 31, comprising a pair of transparent glass plates 47 having similar optical characteristics to the plates 46 and 45 is interposed in the comparison beam 35. The plates are optically flat and hinged for simultaneous angular adjustment at opposite sides of a plane passing through the comparison beam perpendicularly thereto, the plates being preferably hinged together at 48 at one of their ends as shown in the drawings. By making the thickness of the plates 47 substantially equal to the thickness of the plates 45, 46 and 42 the light paths of the partial beams will roughly compensate and a further finer adjustment is possible by angular adjustment of the two hinged compensator plates 47.

In this form the full mirror 38 is adjustable longitudinally in the direction of the arrow 49 for instance or parallel to itself to initially adjust the optical elements of the apparatus into proper relationship.

In Fig. 3 the initial light beam indicated by the arrow above the first beam splitter plate 51 is split by the first beam splitter plate 51 to form the testing beam 52 passing through the plate and the comparison beam 53 reflected by the plate 51. The two partial beams being reflected by the two parallel full mirrors 54 and 55 are brought together and combined by the second beam splitter plate 56. The measuring beam 52 passing through both of the beam splitting plates 51 and 56 is compensated for the inclinable or angularly adjustable compensator plates 57 hinged at 58 and positioned in the comparison beam. These plates 57 may be sufficiently thick to compensate also for the wind tunnel windows (not shown) which would be present in the measuring beam 52. Angular adjustment of the compensator plates 57 will bring the interferometer into zero adjustment.

In Fig. 4 the initial collimated beam of light is indicated at 59 and is split by the splitter plate 60 having its partially transparent reflecting surface 61 facing the light. The measuring beam is reflected as indicated at 62 while the comparison beam 63 passes through the plate, the full parallel mirrors 64 and 65 reflecting the beams 62 and 63 across each other and the second beam splitter plate 66 is interposed at the intersection with its reflecting surface 67 facing the measuring beam 62. The comparison beam therefore goes through both of the beam splitter plates 60 and 66 and the measuring beam 62, reflected by the splitter plate surface 67 combines with the comparison beam to form the interference beam 68 which may be pictured on the interference picture screen 69 by suitable known optical lens elements like the lens 20 in Fig. 1. Wind tunnel windows and test section glass plates are interposed in the measuring beam 62 as indicated at 70 and 71. The two splitter plates 60 and 66 in the comparison beam compensating for at least the two wind tunnel plates 70 (or 71) while the inclinable compensator plates 72, hinged at 73 compensate for the light path change due to passage through the other two windows 71 (or 70) and the light path through the schlieren splitter plate 74 which splits the measuring beam 62 after it traverses the test section to form the schlieren beam 75, disposed to produce a schlieren image at 76 alongside of the interference image on the screen 69.

In this form the full mirror 64 is adjustable in the direction of the arrow 77 for instance to equalize the two partial light path distances between the two beam splitter plates 60 and 66.

The full mirror adjustment, as shown in Figs. 1 and 4 in connection with the mirror 6 (in Fig. 1), or mirror 64 (in Fig. 4) comprises a track or guide frame 78 having a guide block 79 located therein on which the mirror is positioned as at 80. A fine adjustment screw 81 is rotatably mounted in the guide frame 78 and threaded into the block 79 rotation of the screw 81 adjust the block 79 and adjust the mirror longitudinally. Angular adjustment may be made by the set screw 82 threaded in the bracket 83 carried by the block 79 and linked at 84 to the full mirror frame. This is a somewhat conventional adjusting mechanism which may also be employed for the adjustment of the beam splitter plates.

We claim:

In a four plate type interferometer apparatus having a light source, light collimating means for collimating light emanating from the light source to produce a collimated light beam; a first beam splitter plate having a partially transparent reflecting surface inclined across the collimated light beam with the reflecting surface thereof facing toward the light source for splitting the collimated light beam to form reflected diverging collimated measuring partial light beam and a collimated comparison partial light beam passing through the splitter plate; a full mirror plate inclined across each of the partial light beams to reflect the partial light beams across each other at equal linear distances from the reflecting surface of the first splitter plate; a second beam splitter plate having a partially transparent reflecting surface facing toward the full mirror in the measuring beam, parallel to the reflecting surface of the full mirror in the measuring beam, in the plane of intersection of the partial light beams, for passing the comparison light beam therethrough and reflecting the measuring light beam therefrom in combined parallel relation to the comparison beam, to form an interference light beam; and spaced parallel test section flat windows located in the measuring beam having optically flat surfaces and substantially equal in optical thickness and quality to the optical thickness and quality of the two light beam splitter plates traversed by the comparison light beam, whereby the beam splitter plates in the comparison beam compensate for changes in the optical length of the measuring beam due to the passage of the measuring beam through the windows of the test section and an image viewing screen in the path of the interference beam.

ERNST R. G. ECKERT.
THEODOR W. ZOBEL.

References Cited in the file of this patent

FOREIGN PATENTS

| Number | Country | Date |
|---|---|---|
| 631,822 | Germany | June 27, 1936 |
| 720,333 | Germany | May 1, 1942 |
| 883,076 | France | Mar. 15, 1943 |

OTHER REFERENCES

Hardy et al.: Text, "Principles of Optics," pgs. 582 and 583, 1st ed., 1932, McGraw-Hill Book Co., New York city, copy in Division 7.

Sinclair D.: Journal of the Optical Society of America, "Interferometer Method of Plane Stress Analysis," vol. 30, November 1940, pgs. 511 to 513, copy in Division 7.